US00RE47647E

(19) United States
(12) Reissued Patent
Domes

(10) Patent Number: US RE47,647 E
(45) Date of Reissued Patent: Oct. 15, 2019

(54) PNEUMATIC MECHANICAL POWER SOURCE

(71) Applicant: Timothy Domes, Plantation, FL (US)

(72) Inventor: Timothy Domes, Plantation, FL (US)

(21) Appl. No.: 15/787,973

(22) Filed: Oct. 19, 2017

Related U.S. Patent Documents

Reissue of:
(64) Patent No.: 9,163,507
Issued: Oct. 20, 2015
Appl. No.: 14/060,532
Filed: Oct. 22, 2013

U.S. Applications:
(63) Continuation of application No. 12/925,751, filed on Oct. 28, 2010, now Pat. No. 8,561,747, which is a
(Continued)

(30) Foreign Application Priority Data

Apr. 23, 2009 (CN) ..... 2009 8 0124291
Apr. 23, 2009 (EP) ..... 09734367
Apr. 23, 2009 (WO) ..... PCT/US2009/002545

(51) Int. Cl.
*B60K 1/00* (2006.01)
*F03D 9/11* (2016.01)
(Continued)

(52) U.S. Cl.
CPC ..... *B60K 1/00* (2013.01); *B60K 3/04* (2013.01); *B60K 6/00* (2013.01); *B60L 1/003* (2013.01);
(Continued)

(58) Field of Classification Search
CPC ... B60K 1/00; B60K 3/04; B60K 6/00; B60K 1/02; B60K 15/03006; F01C 13/00;
(Continued)

(56) References Cited

U.S. PATENT DOCUMENTS 3,379,008 A 4/1968 Manganaro
3,704,760 A 12/1972 Maruyama
(Continued)

FOREIGN PATENT DOCUMENTS

CN 110348434 11/2007
EP 1749686 6/2006
(Continued)

OTHER PUBLICATIONS

"The History of Compressed Air Vehicles", theair.com 4 page website article, 2006.
(Continued)

*Primary Examiner* — William C Doerrler
(74) *Attorney, Agent, or Firm* — Alfred M. Walker; John F. Vodopia; Mark Bender

(57) ABSTRACT

An mechanical power system provides torque without using a heat engine where fossil-fuel engines have conventionally been used, by replacing the fossil-fuel burning engine with a rotary pneumatic motor and feeding pressure-regulated compressed gas to the rotary pneumatic motor. The rotary pneumatic motor can be used anywhere, and requires preferably compressed nitrogen in a non-liquid state. Automotive, marine and electrical generating applications are adaptable, and auxiliary power is available for emergencies where a supply of compressed gas has been exhausted. A screw-type compressor can be electrically powered to supply compressed gas to the pneumatic motor where tanks of compressed gas have been exhausted. An electrical generating power plant includes an array of solar panels for generating direct current (DC) and a DC/AC converter for converting the DC to alternating current (AC) and outputting a portion of the AC via a power plant output port to supply an AC load.

38 Claims, 3 Drawing Sheets

Related U.S. Application Data continuation-in-part of application No. 12/736,357, filed on Sep. 30, 2010, now abandoned, and a continuation-in-part of application No. 12/150,193, filed on Apr. 26, 2008, now Pat. No. 8,225,900.

(51) Int. Cl.

| | |
|---|---|
| ***B60K 6/00*** | (2006.01) |
| ***F03D 9/00*** | (2016.01) |
| ***F02C 6/16*** | (2006.01) |
| ***B60K 3/04*** | (2006.01) |
| ***B60L 50/62*** | (2019.01) |
| ***F01C 13/00*** | (2006.01) |
| ***B60L 8/00*** | (2006.01) |
| ***B60L 1/00*** | (2006.01) |
| ***B60L 50/90*** | (2019.01) |
| ***B60L 58/20*** | (2019.01) |
| ***F03G 6/00*** | (2006.01) |
| ***F03D 9/25*** | (2016.01) |
| ***B60K 1/02*** | (2006.01) |
| ***B60K 15/03*** | (2006.01) |

(52) U.S. Cl.

CPC ..... *B60L 8/003* (2013.01); *B60L 50/62* (2019.02); *B60L 50/90* (2019.02); *B60L 58/20* (2019.02); *F01C 13/00* (2013.01); *F02C 6/16* (2013.01); *F03D 9/007* (2013.01); *F03D 9/11* (2016.05); *F03D 9/25* (2016.05); *F03G 6/001* (2013.01); *B60K 1/02* (2013.01); *B60K 15/03006* (2013.01); *B60L 2200/26* (2013.01); *B60L 2210/30* (2013.01); *B60L 2210/40* (2013.01); *Y02E 10/46* (2013.01); *Y02E 10/465* (2013.01); *Y02E 10/725* (2013.01); *Y02E 20/14* (2013.01); *Y02E 60/15* (2013.01); *Y02E 70/30* (2013.01); *Y02T 10/6217* (2013.01); *Y02T 10/7005* (2013.01); *Y02T 10/7066* (2013.01); *Y02T 10/7077* (2013.01); *Y02T 10/7083* (2013.01); *Y02T 10/7241* (2013.01)

(58) Field of Classification Search

CPC ..... F02C 6/16; F03G 6/001; B60L 11/002; B60L 1/003; B60L 8/003; B60L 11/126; B60L 11/1868; B60L 2200/26; B60L 2210/40; F03D 9/021; F03D 9/11; F03D 9/25; F03D 9/007; Y02E 10/46; Y02E 10/725; Y02E 20/14; Y02E 60/15; Y02E 70/30; Y02T 10/6217; Y02T 10/7005; Y02T 10/7077; Y02T 10/7241; Y02T 10/7066; Y02T 10/7083

See application file for complete search history.

(56) References Cited

U.S. PATENT DOCUMENTS

| | | | | | |
|---|---|---|---|---|---|
| 3,771,902 | A | | 11/1973 | Bandy | |
| 3,828,880 | A | | 8/1974 | Smith | |
| 3,980,152 | A | * | 9/1976 | Manor | 180/313 |
| 3,986,575 | A | * | 10/1976 | Eggmann | B60K 3/04 180/302 |
| 4,043,126 | A | * | 8/1977 | Santos | 60/407 |
| 4,163,367 | A | * | 8/1979 | Yeh | 60/414 |
| 4,246,988 | A | | 1/1981 | Hoppie | |
| 4,337,842 | A | * | 7/1982 | Spangler et al. | 180/302 |
| 4,355,508 | A | * | 10/1982 | Blenke et al. | 60/416 |
| 4,360,222 | A | | 11/1982 | Fisher | |
| 4,370,857 | A | * | 2/1983 | Miller | 60/413 |
| 4,383,589 | A | * | 5/1983 | Fox | 180/165 |
| 4,537,269 | A | | 8/1985 | Fisher | |
| 4,596,119 | A | * | 6/1986 | Johnson | 60/407 |
| 4,798,053 | A | * | 1/1989 | Chang | B60K 6/12 180/165 |
| 5,460,239 | A | * | 10/1995 | Jensen | 180/302 |
| 5,708,306 | A | | 1/1998 | Lin | |
| 5,727,388 | A | | 3/1998 | Adamides | |
| 5,788,006 | A | * | 8/1998 | Yamaguchi | B60K 6/365 180/65.235 |
| 5,925,993 | A | | 7/1999 | Lansberry | |
| 5,945,749 | A | | 8/1999 | Li | |
| 6,036,282 | A | | 3/2000 | Clarke | |
| 6,054,838 | A | * | 4/2000 | Tsatsis | B60K 6/12 180/165 |
| 6,073,712 | A | | 6/2000 | Buglione | |
| 6,213,234 | B1 | * | 4/2001 | Rosen et al. | 180/65.245 |
| 6,311,797 | B1 | * | 11/2001 | Hubbard | 180/165 |
| 6,349,787 | B1 | * | 2/2002 | Dakhil | 180/302 |
| 6,363,723 | B1 | | 4/2002 | Negre | |
| 6,508,324 | B1 | * | 1/2003 | Conley, Jr. | 180/165 |
| 6,629,573 | B1 | * | 10/2003 | Perry | 180/54.1 |
| 6,758,436 | B2 | | 7/2004 | Rehkemper | |
| 6,862,973 | B2 | | 3/2005 | Rehkemper | |
| 7,028,482 | B2 | * | 4/2006 | Cho et al. | 60/698 |
| 7,107,767 | B2 | | 9/2006 | Frazer | |
| 7,252,165 | B1 | | 8/2007 | Gruenwald | |
| 7,315,089 | B2 | * | 1/2008 | Lambertson | 290/1 A |
| 7,325,638 | B1 | * | 2/2008 | Belloso | B60K 5/08 180/14.2 |
| 7,389,837 | B2 | | 6/2008 | Tamai | |
| 7,469,527 | B2 | | 12/2008 | Negre et al. | |
| 7,559,394 | B2 | * | 7/2009 | Rask et al. | 180/165 |
| 7,647,994 | B1 | * | 1/2010 | Belloso | B60K 6/448 180/65.31 |
| 7,847,495 | B2 | | 12/2010 | Oyobe | |
| 8,056,665 | B2 | * | 11/2011 | Leonard et al. | 180/165 |
| 8,177,002 | B2 | * | 5/2012 | Cong | 180/2.2 |
| 8,225,900 | B2 | * | 7/2012 | Domes | 180/302 |
| 8,561,747 | B2 | * | 10/2013 | Domes | 180/302 |
| 8,701,804 | B1 | * | 4/2014 | Antrobus | 180/65.31 |
| 9,290,098 | B2 | | 3/2016 | Nguyen | |
| 2003/0037978 | A1 | * | 2/2003 | Hofbauer | B60K 6/48 180/65.25 |
| 2003/0104899 | A1 | * | 6/2003 | Keller | B60K 6/24 477/2 |
| 2003/0209374 | A1 | * | 11/2003 | Gallo, Jr. | 180/65.2 |
| 2003/0231005 | A1 | * | 12/2003 | Kohama | B60K 6/445 320/132 |
| 2004/0237517 | A1 | * | 12/2004 | Cho et al. | 60/370 |
| 2006/0196714 | A1 | * | 9/2006 | Sugimoto | B60W 20/13 180/242 |
| 2006/0225941 | A1 | * | 10/2006 | Cole | 180/302 |
| 2009/0044995 | A1 | * | 2/2009 | Kobayashi | B60K 6/46 180/65.21 |
| 2009/0250276 | A1 | * | 10/2009 | Goodwin | B60K 6/28 180/65.265 |
| 2009/0266069 | A1 | * | 10/2009 | Domes | 60/409 |
| 2009/0314563 | A1 | * | 12/2009 | Burkholder | B60W 10/06 180/65.265 |
| 2010/0044129 | A1 | * | 2/2010 | Kyle | B60K 6/26 180/65.25 |
| 2010/0086414 | A1 | * | 4/2010 | Tai | 417/34 |
| 2010/0158702 | A1 | * | 6/2010 | Colavincenzo | 417/16 |
| 2010/0181125 | A1 | * | 7/2010 | Wang | B60K 6/387 180/65.22 |
| 2011/0014828 | A1 | * | 1/2011 | Domes | 440/3 |
| 2011/0049909 | A1 | * | 3/2011 | Domes | 290/1 R |

FOREIGN PATENT DOCUMENTS

| | | | |
|---|---|---|---|
| EP | 1749686 | | 2/2007 |
| EP | 09734367.7 | A1 | 4/2013 |
| FR | 2278948 | A1 | 2/1976 |
| GB | 2150225 | A1 | 6/1985 |
| JP | 11020485 | | 1/1999 |

(56) References Cited

FOREIGN PATENT DOCUMENTS

| | | |
|---|---|---|
| WO | 2006122333 | 11/2006 |
| WO | PCTUS002545 | 11/2009 |

OTHER PUBLICATIONS

"Advantages of compressed air as an energy vector", Air Car Factories—Energy Storage, the aircar.com, 5 page wbsite, 2007.
Arabe; Katrina, "Hydraulic Regenerative Braking Boosts Fuel Economy", Thomas Net.com Industrial Market Trends, 4 page web magazine article, Aug. 14, 2006.
"CATA Compressed Natural Gas Program 1993-2005" catabus.com, 2 page website article, 2005.
IAGS Energy Security, "EPA Displays the First Advanced Hydraulic Hybrid Vehicle", Institute for the Analysis of Global Security, 3 page website article, Mar. 31, 2004.
IR Racing Knife, advertisement for air compressors,1 page.
"Nitrogen Tire Inflation Systems", NothernTool.com print catalog, p. 6one page advertisement, 2006.
"Rotary Screw Compressors" NorthernTool.com print catalog, p. 6, one page advertisement, 2006.
NitroPro, Nitrogen Tire Filling, RTI Technologies, South Florida Auto News, Apr. 2007, advertisement.
Orion V Orion Bus Industries, 3 page advertisement, 2006.
Reidy; R.F., "Gas Flow Diagram for our Nitrogen-Powered Car" one page website, Aug. 6, 1997.
Sopel; Jon, "France to unveil air-powered car", BBC News, news.bbc.co.uk, 3 page advertisement, Aug. 14, 2006.
Liquid Nitrogen Vehicle:Disadvantages,servinghistory.com two page website, 2010.
Reidy, R.F. "A car powered by Nitrogen!" University of North Texas, 7 page website, Jul. 1997.
BBC News "Mexico set to have eco-taxis", 3 page website, Oct. 26, 2000.
MDI AirCar, Motor Development International, 1 page website, 2006.
"Analysis of Calculations to forecast energy of CAT's remedies using MDI technology", aircar.com, 10 page website.
Wikipedia, "liquid Nitrogen Vehicle", 5 page website, 2010.

* cited by examiner

PNEUMATIC MECHANICAL POWER SOURCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation of application Ser. No. 12/925,751 filed Oct. 28, 2010, which application is a continuation-in-part of application Ser. No. 12/736,357, filed on Sep. 30, 2010, abandoned. Application Ser. No. 12/736,357 is a United States national phase patent application of an international Patent Cooperation Treaty (PCT) patent application number PCT/US2009/002545 filed on Apr. 23, 2009 and claims priority therefrom. PCT/US2009/002545 is a continuation-in-part of application Ser. No. 12/150,193, filed Apr. 26, 2008, now U.S. Pat. No. 8,225,900 issued Jul. 24, 2012 and claims priority therefrom. These applications are incorporated by reference herein. This application claims priority in part under 35 U.S.C. §120 from the aforesaid applications.

FIELD OF THE INVENTION

The present invention relates to a novel combination of a rotary pneumatic motor powered by compressed gas in combination with any of a wide variety of conventional applications.

Examples of conventional power applications to which a compressed-gas-driven rotary pneumatic motor may be applied include, without being limited to, transportation, electrical power generation, industrial and commercial power applications, commercial or residential electricity co-generation, operating compressors for compression of suitable gasses for use as a source of operating pressure for rotary pneumatic motors.

The present invention is expressed in three broad embodiments. In embodiment Number 1 a compressed-gas-driven rotary pneumatic motor is conventionally connected to a mechanical device, such as an automotive transmission, wherein the torque output of the rotary pneumatic motor [RPM] is used directly to produce transmitted torque, such as where the RPM, connected to an automotive transmission, transmits torque to the traction wheels of a motor vehicle.

In embodiment Number 2 of the present invention the RPM is conventionally connected to an electric generator or alternator. The resulting electric power is used conventionally.

Embodiment Number 2 of the present invention, for example, may be used in a transportation context, such as in a railroad locomotive where a conventional diesel engine is replaced with a compressed-gas-driven RPM.

The advantage in doing so would be to eliminate the requirement for combustion of fossil fuel (diesel fuel in this example) and eliminate the need for a heat engine (the diesel engine must burn fuel to develop compression for turning its crankshaft). The RPM of the present invention is not a heat engine.

Preferred Embodiment Number 1 of the present invention may be exemplified by combining a compressed-gas-powered rotary pneumatic motor [CGD RPM] with a conventional mechanical locomotion device, such as an automobile, wherein the compressed gas is carried in refillable, replaceable tanks onboard the locomotion device. In addition to an automobile, the locomotion device may be any conventional vehicle, including buses, trucks, heavy construction and earth-moving equipment, off-road vehicles, railway locomotives and all kinds of water craft.

The locomotion device of the preferred embodiment will have all of the familiar the conventional user controls, such as throttle, brakes, and indicators of fuel availability. In the case of the present invention, fuel availability information will include an analog indication of the pressure of compressed gas remaining available for motive power.

The locomotion device of preferred Embodiment Number 1 of the present invention will additionally have all the auxiliary power systems conventionally included in automotive vehicles, such as, only by example and without limitation, auxiliary electrical power generation by power take-off from the RPM, an air-conditioning and/or refrigeration power take-off from the RPM as well as pumps operated by RPM power take-offs that may be required for power steering and braking assistance. Interior vehicle space heating will be accomplished electrically with electric power The locomotion device of preferred Embodiment Number 1 of the present invention will additionally have auxiliary conventional-fuel engines, battery arrays, auxiliary electrical generators auxiliary compressors and auxiliary electric motors. Although the locomotion device will be primarily powered pneumatically by compressed gas, provision is made for operating the vehicle in the emergency condition where compressed gas pressure has been exhausted. Until the on-board compressed gas tanks can be refilled, auxiliary compressed air may be generated on board the vehicle by means of an electrically-powered on-board screw-type air compressor. The electric power to operate the screw-type compressor may be furnished by any of an on-board lithium-ion (Li-ion) battery array, a conventional 12 Volt automobile battery or, by an auxiliary on-board electric generator powered by a relatively small on-board fossil-fuel engine. In the case of the conventional 12 Volt battery and Li-ion battery array, the DC output is converted to AC to drive the screw-type air compressor using a conventional converter.

The rotary pneumatic motor of the present invention runs preferably on compressed nitrogen under stored compression of about 4,000 PSI. The nitrogen is preferred over compressed air because it can be produced relatively free of water vapor. The nitrogen will be transmitted from storage tanks at about 4,000 PSI via pipes to at least one regulator which will reduce the nitrogen pressure to an operating range of from about 90 PSI to about 150 PSI, but preferably about 120 PSI. The rotary pneumatic motor of the present invention will normally be designed to operate within the preferred range of gas pressures from about 90 PSI to about 150 PSI.

Rotary Pneumatic Motors are not novel. They are commonly found in such applications as air tools, where the gas used to operate them is compressed air. However, while not new, Rotary Pneumatic Motors until the present invention have not been known to be installed in power applications conventionally requiring fossil fuel consuming internal combustion engines. Such combination is one of the important elements of the novelty of the present invention.

Moreover, a significant disadvantage in using compressed air is the moisture which is unavoidably trapped when normal humidity is included with compressed atmospheric air. The moisture trapped when air is being compressed should be stripped from the air intake prior to compression, if possible. Tanks which hold compressed air must have condensed water purged frequently. Water vapor and liquid water will interfere with the operation of rotary pneumatic motors and cause their internal parts to wear excessively. Preferably, an air drier or dehumidifier is included in the compressed air line proximate the screw type air compressor to remove water and water vapor from the compressed air.

In embodiment Number 3 of the present invention, the RPM is utilized and connected to an electrical generator or alternator for use to generate AC electrical power in large industrial plant applications. In this case, the RPM is driven by DC, converted to AC in a inverter/generator, which DC is generated from solar panels. Because a physical plant may be presumed to have space for storing numerous tanks, as distinguished from the space available in a locomotive device, embodiment number 3 is a closed fluid/gas system, where the low pressure gas output from the RPM is stored at low pressure, in one or a number of tanks capable of handling the large volume of gas resulting from the down conversion of pressure.

BACKGROUND OF THE INVENTION

Conventional engine-powered locomotors, such as, for example, but without limitation, automobiles, trucks, heavy construction and earth-moving equipment, railroad locomotives and ships and boats large and small, all employ some form of gasoline, diesel or natural-gas fueled internal combustion engine to generate kinetic energy.

In automobiles, for example the kinetic energy of a fossil-fuel engine is normally collected in a rotating crankshaft and fed to a transmission. The automobile driver controls a throttle and the transmission in turn provides the user-controlled motive power.

Among the huge disadvantages in the conventional fossil-fuel based motive power systems are (1) dependence on increasingly expensive non-renewable fossil fuels as a primary source of energy; (2) unavoidable emission of carbon dioxide as a combustion by-product; and (3) unavoidable enormous waste of the chemical energy of the fossil fuel in the form of heat (every heat engine has a radiator or some other form of heat dissipation means. The heat energy unavoidably dissipated by heat engines constitutes waste of a substantial portion of the energy original contained within the fuel being consumed).

For example, it has been estimated that for gasoline engines at peak efficiency, only about 22% of the chemical energy stored in the gasoline gets turned into crankshaft kinetic energy. The remaining 78% of the energy is wasted, chiefly in the form of heat.

Failure to quickly remove waste heat from an internal combustion engine will result in overheating and engine destruction due to seize-up. Thus, internal combustion engines are mechanically required to be fitted with radiators. Not only does a heat radiator dissipate perhaps 78% of the energy of gasoline, but the radiator system itself, with its coolant pumps, belts and pulleys creates its own energy demand upon the engine crankshaft. This requires an engine of large enough capacity to run the coolant system while still supplying sufficient kinetic energy to the vehicle transmission.

Diesel engines have been said to achieve peak thermal efficiencies in the range of 45% [i.e., 45% of the chemical energy of the diesel fuel is translated into useable kinetic energy].

In contrast, the present invention does not employ a heat engine at all to power a locomotor. Instead, it employs a rotary-torque pneumatic engine wherein the torque is developed by furnishing a supply of compressed gas to the pneumatic engine, preferably pre-compressed nitrogen. The compressed gas enters the engine's rotary chambers, where it is permitted to force the pneumatic engine to rotate. The rotation is conventionally captured by a drive shaft that is connected conventionally to whatever application is desired. For example, the drive shaft may be connected to a transmission and drive train of a conventional locomotor motor vehicle, or car.

Among the novel features of the present invention is that the source of energy for motive power is brought aboard the mechanical locomotion device in the form of one or more canisters of compressed nitrogen gas. The potential energy has already been stored in the canisters by the fact of the compression, because energy was needed to compress the nitrogen gas to get it into the canisters in the first place.

Turning the stored energy inherent in the compressed gas into useable kinetic energy simply requires conveying the compressed gas by pipe or conduit from its storage canisters, feeding it to one or more pressure regulators to reduce its pressure appropriate for feeding into the rotary pneumatic energy, and finally allowing the regulated and thus lowered-pressure compressed gas to drive the pneumatic engine. In the present invention's pneumatic rotary engine no heat is required to be generated to derive the required motive power, as compared to internal combustion engines, where heat generation and heat waste cannot be avoided.

An additional novel feature of the present invention is that employing it for motive power leaves absolutely no or a very small carbon footprint, compared to the substantial carbon foot print of conventional fossil fuel powered mechanical locomotion devices. A so-called carbon footprint is the term used to describe machines or processes that emit carbon dioxide into the atmosphere.

The energy required to compress the pre-compressed nitrogen gas used to power the rotary pneumatic motor of the present invention may be harvested from various renewable sources, at least in part. Thus, producing the compressed gas needed for the present invention could result indirectly in a carbon footprint, but it is one that will be smaller than the carbon footprint resulting from conventional fossil fuel transportation.

The preferred nitrogen gas for use with the present invention comprises 78% of the earth's atmosphere and it is non toxic and not dangerous. It cannot burn or support combustion and is chemically so stable that it is almost inert. Nitrogen is available inexhaustibly from the atmosphere, and will be directly returned to the atmosphere once it is decompressed upon exhaustion from the rotary pneumatic motor of the present invention.

U.S. Pat. No. 6,349,787 of Dakhill describes a motor for vehicles which uses liquid nitrogen, not gaseous nitrogen, and the liquid nitrogen is costly energy-wise, because it requires heating and depleting the liquid nitrogen. Additionally the engine of Dakhill is a turbine type, not a rotary engine.

In this manner the earth's atmosphere will be not be disturbed or polluted either thermally or chemically by use of the present invention. Since the atmosphere is thermally disturbed and chemically polluted by dumping of waste heat and carbon dioxide from conventional internal combustion engines. The present invention thus contributes an immediate large-scale alternative to fossil fuel based transportation while addressing global warming by substantially terminating the addition of carbon dioxide to the atmosphere as a result of transportation activities.

However, transportation is not the only field in which internal combustion or fossil fuel combustion may be replaced by a compressed-gas-driven rotary pneumatic motor. Also eligible for the improvement in energy efficiency, the substantial elimination of carbon dioxide emissions, reduction in cost of energy are such fields as structural heating, ventilation and air conditioning [HVAC] by means of individually-sited electrical generators operated by on-site by rotary pneumatic motors. As such, the invention takes the form of embodiment Number 3, described above, whereby a closed nitrogen closed gas system, and the resulting electrical power realized thereby may be used for all conventional energy needs typically serviced by large electrical power plants. For example, the large AC output can by used for industrial space heating, electrical-heat cooking and so forth. The present invention in embodiment No. 3 is capable of application to any scale of HVAC, for example including, without limitation, residential, commercial, industrial and governmental AC power generation needs. All of the heat energy and kinetic energy requirements of industrial applications may be met using present invention of embodiments Numbers 1, 2 and 3, or in any combination thereof.

Objects of the Invention

It is an object of the present invention to provide a mechanical locomotion device using a rotary pneumatic engine as motive power.

It is an object of this invention to use on-board stored compressed gas, i.e., $N_2$, not in liquid form, as the force fluid for the rotary pneumatic engine.

It is a further object of the invention to provide mechanical locomotion device that does not require a heat engine for primary motive power.

It is a further object of the invention to provide a rotary pneumatic engine which can use either compressed nitrogen or compressed air to produce motive power.

It is an object of the invention to provide a transportation locomoting power source that substantially avoids the use of fossil fuels as a source of primary motive energy.

It is an object of the invention to provide a mechanical locomotion device that does not add heat to the atmosphere during operation.

It is an object of the invention to provide a mechanical locomotion device that does not add products of fossil fuel combustion to the atmosphere during operation.

It is an object of the invention to provide a mechanical locomotion device that does not contribute to atmospheric smog during operation.

It is an object of the invention to provide a mechanical locomotion device that makes a substantial overall reduction in general energy consumption in the fields of personal and commercial ground and marine transportation.

It is an object of the invention to provide a mechanical locomotion device that does not waste, in the form of heat, a substantial portion of the energy consumed by it during operation.

It is an object of the invention to provide a motive power source for most non-aviation applications that does not involve the use of a heat engine.

It is an object of the invention to provide a method of reducing the emission of greenhouse gases resulting from the combustion of fossil fuels in most non-aviation applications.

It is an object of the invention to provide a source of motive power that will permit drastically reduced dependence on fossil fuels.

It is an object of the invention to provide a method permitting drastically reduced dependence on fossil fuels.

It is an object of the invention to provide a non-heat-engine motive power source for replacing such stationary applications as fossil-fuel consuming stationary engines, including conventional steam-turbine industrial scale electric generating power plants where fossil fuels are burned as an energy source for the motive power needed to drive electric generators.

It is an object of the invention to provide a non-heat-engine motive power source for novel stationary applications such as residential and small-to-medium-scale scatter-site electrical co-generation so as to provide a means for individual pinpoint location enhanced low-cost electrical generation to permit the elimination of fossil fuels for such applications as residential home cooking, heating and air conditioning, as well as to permit low-cost electrical energy for commercial, governmental and industrial electrical consumption for such conventional applications as heating, ventilation and air conditioning, and any other conventional application of electrical energy, all to the elimination of fossil-fuel consuming stationary engines and all to the elimination of consumption of electrical energy produced by the combustion of fossil fuels as an energy source for the motive power needed to drive electric generators.

It is an object of the invention to provide a method for substantially reducing dependence on fossil fuels for novel stationary applications such as residential and small-to-medium-scale scatter-site electrical co-generation so as to provide a means for individual pinpoint location enhanced low-cost electrical generation to permit the elimination of fossil fuels for such applications as residential home cooking, heating and air conditioning, as well as to permit low-cost electrical energy for commercial, governmental and industrial electrical consumption for such conventional applications as heating, ventilation and air conditioning, and any other conventional application of electrical energy, all to the elimination of fossil-fuel consuming stationary engines and all to the elimination of consumption of electrical energy produced by the combustion of fossil fuels as an energy source for the motive power needed to drive electric generators.

It is an object of the invention to provide a non-heat-engine for driving an AC generator to operate in tandem with at least one array of solar panels, or a wind turbine to output AC at times where the solar panels are unable to provide enough power to meet an electrical load on the system. During times when the solar panels generate an amount of electrical energy in excess of the plant's instant power output requirements, the excess AC is used to drive a compressor to compress nitrogen gas, and/or is converted to DC to charge the batteries. When the solar panels' electrical output drops below the instant load need, the compressed gas is used to drive the RPM to generate AC to compensate, or to be used in place of AC generated by the panels.

Of course the AC generated by the RPM by the compressed gas can be supplemented by the DC stored in the batteries, after conversion to AC by an inverter/generator, or other efficient DC to AC converter. Because a physical plant may be presumed to have space for storing numerous tanks, as distinguished from the space available in a locomotive device, embodiment number 3 is a closed fluid/gas system, where the low pressure nitrogen gas output from the RPM is stored at low pressure, in one or a number of tanks capable of handling the large volume of gas resulting from the down conversion of pressure. The AC generating plant or system is not limited to being powered using solar panels, but could be instead powered by a wind turbine, a hydro-driven turbine, such as a water wheel, or any combination depending on available natural resources at the geographic location of the plant.

In keeping with the present invention other objects will make themselves clear to users of the device and to those of skill in the art, and thus this invention is not limited to the objectives here enumerated, which are not exhaustively presented and are described merely by way of example.

SUMMARY OF THE INVENTION

In keeping with these objects and others which may become apparent, the present invention relates preferably to Embodiment Number 1 which may be exemplified, without being limited to, by a conventional automobile fit for driving on public highways that is powered by a rotary pneumatic engine driven by regulated-pressure compressed gas stored one or more high-pressure tanks on board the vehicle.

Other examples of the expression of preferred Embodiment Number 1 may include any type of machine that has in the past been powered by a fossil fuel heat engine, such as, but without being limited to, trucks, buses, heavy construction equipment, earth moving machinery, boats, ships and all kinds of watercraft, and virtually any land or water useable machinery, including, where appropriate, stationary equipment such as diesel-powered electric generators.

Preferably the compressed gas is nitrogen not in liquid form, at a storage pressure of about 4,000 PSI.

The compressed gas storage may take any form, such as on-board tanks shaped to fit any automotive body cavity. Preferably the on-board tanks are small removable and replaceable cylinders that may be conveniently handled and replaced by an automobile driver or a recharge-station attendant.

The rotary pneumatic engine of the present invention will supply conventional rotating power to a crankshaft. The crankshaft is preferably fitted to a conventional automotive transmission so that power is transferred conventionally to the wheels of the vehicle.

In the event that the on-board supply of compressed nitrogen gas is exhausted during vehicle operation, an alternate means of power is provided. Since the rotary pneumatic engine is driven by compressed gas, an auxiliary screw-type compressor is provided on board the automobile to generate compressed air. In turn, the screw-type compressor may be electrically powered by an on-board lithium-ion battery array, by a conventional 12 Volt DC battery normally found in automobiles, where either is coupled to a converter to AC, or by a relatively small auxiliary fossil fuel engine connected to an auxiliary electrical generator. A relatively small fossil fuel auxiliary fuel tank will be required in the case of the auxiliary fossil fuel generator.

In a situation where compressed nitrogen pressurized gas has been exhausted before it can be replenished, the screw-type compressor is started, either manually or automatically to compress air. The resulting compressed air is fed through at least one pressure regulator to the pneumatic engine as an alternative to the primary compressed nitrogen. The rotary pneumatic engine of the present invention will run on compressed air, although compressed nitrogen is the preferred gas.

Compressed nitrogen is the preferable primary power source because it is relatively dry, i.e., free from water vapor. Non-preferred compressed gas is air, because compressing atmospheric air inevitably entrains water vapor with it during compression. Water vapor condensation will occur inside storage tanks and the resulting liquid water condensate will need to be periodically purged.

Hence, a dehumidifier or drier is included in the compressed air line from the auxiliary screw-type compressor to the RPM, preferably proximate the compressor, in order to remove as much water vapor and condensed water as possible from the compressed air.

The rotary pneumatic motor will have the customary conventional power take-offs found in fossil fuel engines for operating conventional alternators or generators, for operating pumps for power steering, power braking, air conditioning, and all other conventional peripheral machinery In the preferred Embodiment Number 1 of the present invention, the rotary pneumatic motor is directly attached to a conventional automotive transmission so that the rotary pneumatic motor provides torque to the transmission in the same mechanical fashion as a conventional fossil fuel automotive engine.

In an exemplary automotive expression of non-preferred Embodiment Number 2, the rotary pneumatic motor may be conventionally-connected to an electric generator, wherein the motor vehicle's motive power is provided by at least one electric motor. The most common familiar example is an electrically powered automobile or a hybrid automobile.

The at least one electric motor in this example may be conventionally connected to an automotive transmission or may comprise a plurality of electric motors connected with varying automotive arrangements to the traction wheels of the vehicle.

An additional advantage to be achieved in using electric motors to power the vehicle's traction wheels is the availability of further energy conservation in the form of dynamic regenerative braking, wherein the user's application of brakes causes the one or more electric motors to operate as generators, feeding current to an on-board Lithium-Ion battery array, and thus capturing at least a portion of the vehicle's kinetic energy as electric energy during braking.

By comparison, under the common conventional arrangement, fossil-fuel-powered vehicles have no dynamic braking, with the conventional braking system simply dissipating the vehicle's kinetic energy in the form of heat during braking.

In one embodiment, the invention includes pneumatic-powered locomoting transporter. The pneumatic-powered locomoting transporter comprises a housing, at least one rotary pneumatic motor (RPM), a supply of compressed nitrogen gas contained in user-replaceable, user re-fellable storage containers within said housing, wherein said motor is connected in fluid communication with said gas storage containers by conduits having at least one gas pressure regulator, at least one auxiliary fossil-fuel engine with a supply of a fossil fuel for energizing said auxiliary engine, at least one electric generating device connected to said auxiliary engine for producing electric current and at least one electrically powered screw-type compressor electrically connected with said at least one electric generating device for producing compressed air.

The compressor in fluid communication with said conduits having at least one gas pressure regulator for supply said compressed air to said RPM, and including a dehumidifier for removing liquid and vapor water from said conduits. The at least one rotary pneumatic engine is crankshaft-connected to a conventional automotive transmission for feeding power to the conventional traction wheels of said locomoting transporter.

The transporter preferably includes that the at least one rotary pneumatic engine is crankshaft-connected to an electrical generator for generating electricity as a primary source of energy, where a conventional automotive transmission is crankshaft-connected to an electric motor, said electric motor being in electrical connection with said electrical generator, said conventional automotive transmission for feeding torque upon user-controlled demand to the conventional traction wheels of said locomoting transporter.

The transporter preferably includes that the electric motor comprises a motor-generator for dynamic braking capture of vehicular kinetic energy as electrical energy and that the locomoting transporter comprises one of: at least one array of lithium-ion batteries and one or more conventional 12 Volt batteries, or both, connected to said motor generator for capturing electrical energy resulting from said dynamic braking of said locomoting transporter.

In another embodiment, the invention includes an electrical generating power plant. The plant comprises an array of solar panels for generating direct current (DC), a DC/AC converter for converting the DC to alternating current (AC) and outputting a portion of the AC via a power plant output port to supply an AC load, an array of electrical storage cells electrically connected to the solar panels that are controlled to receive and store DC power, and that re controlled to output stored DC power for conversion and output by the DC/AC converter under certain conditions, a screw-type gas compressor connected to and powered by the DC/AC converter for compressing nitrogen gas to a high pressure state and high pressure tanks connected by a high pressure conduit to the compressor for receiving the high pressure nitrogen gas.

A rotary pneumatic motor (RPM) is connected to the compressor and high pressure tanks via the high pressure conduit, an alternator/generator mechanically connected to the RPM by a drive shaft in order to generate AC when the RPM is driven by said compressed Nitrogen gas and low pressure tanks in fluid communication with the RPM at one end via low pressure conduit, and in fluid communication to the compressor at its other end via a low pressure conduit forming a closed loop for compression/decompression of the nitrogen gas as an energy carrier to drive the RPM to generate and output AC by the alternator generator, provided to the plant output port. The screw type gas compressor operates to compress the nitrogen gas to around 4000 PSI.

The electrical generating plant preferably further comprises a wind turbine generator and an AC/DC converter. The wind turbine generator is electrically connected to the output port, to an input port of the AC/DC converter and to the compressor. The AC/DC converter is electrically connected to the electrical storage cells.

The invention further includes a residential emergency electrical generating system comprising the electrical generating plant, a commercial emergency electrical generating system comprising the electrical generating plant and an industrial scale fixed-plant electrical generating system comprising the electrical generating plant set forth in claim 37.

For that matter, the electrical generating plant preferably further comprises at least one array of lithium-ion batteries in electrical connection with said screw-type compressor through a DC/AC converter, for augmentation of the electrical power available to power said screw-type compressor, and/or at least one 12 Volt conventional battery in electrical connection with said screw-type compressor through a DC/AC converter, for augmentation of the electrical power available to power said screw-type compressor.

BRIEF DESCRIPTION OF THE DRAWINGS

The present invention can best be understood in connection with the accompanying drawings. It is noted that the invention is not limited to the precise embodiments shown in drawings.

FIG. 2 is identical to FIG. 1 except for the interposition of an electric generator and an electric motor combination between the rotary pneumatic motor and the conventional automotive automatic transmission.

LIST OF REFERENCE NUMERALS

Figure 1:
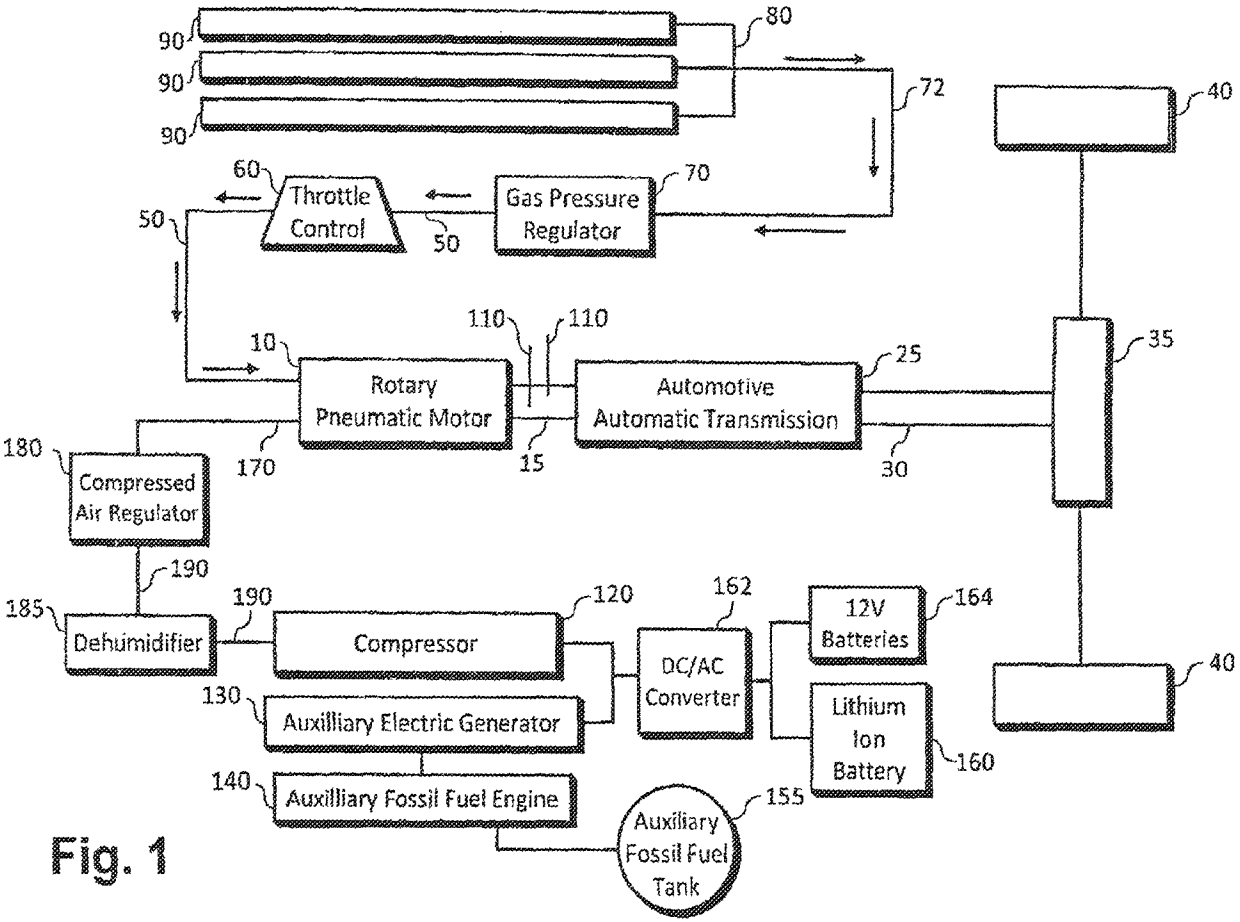
FIG. 1 shows a schematic view of the arrangement of Embodiment Number 1 of the present invention as adapted for a conventional automobile. Only the rotary pneumatic motor and the power train are shown for storing energy in the form of compressed gas and controllably releasing it to the rotary pneumatic motor to produce torque to be supplied to a conventional automatic transmission.

For FIG. 1, Embodiment Number 1

10 Rotary Pneumatic Motor
15 Main Rotating power (torque) delivery shaft
25 Conventional Automotive automatic transmission
30 Conventional Automotive shaft transmitting power from automatic transmission to gearbox
35 Conventional Automotive gearbox
40 Conventional Automotive traction wheels
50 Low-pressure (pressure regulated) compressed gas feed line input to Rotary Pneumatic Motor 10.
60 User throttle control for user control of gas pressure fed to rotary pneumatic motor 10.
70 Gas pressure regulator for regulating high-pressure compressed gas and furnishing it downline to rotary pneumatic motor 10 as regulated low-pressure compressed gas.
72 Feed line for conducting High pressure compressed gas from manifold 80 to pressure regulator 70.
80 Manifold for conducting high-pressured compressed gas from storage tanks 90 into high-pressure gas feed line 72.
90 Replaceable Refillable Storage Tanks for High Pressure Compressed Gas
110 Conventional Automotive power take-offs for such conventional applications as operating auxiliary generator or alternator, operating pumps for power steering and power braking, air conditioning compressors, and the like.
120 Electrically powered screw-type compressor produces compressed air to be fed via compressed air line 190 to compressed air regulator 180 and into feed line 170 for delivery of compressed air to rotary pneumatic motor 10 when compressed gas in tanks 90 has been depleted.

130 Auxiliary electric generator connected by electrical connection 150 to both screw type compressor 120 and to Lithium-ion battery array 160 for feeding electrical power to both 120 and 160 respectively or alternately for feeding electrical power to them one-at-a-time.

140 Auxiliary fossil fuel engine is connected to auxiliary electrical generator 130 for generating electrical power on demand to be fed to either or both screw type compressor 120 and/or Lithium-Ion battery array 160.

150 Electrical interconnection among screw type compressor 120, electric generator 130 and Lithium-ion battery array 160.

155 Auxiliary fossil fuel tank serves auxiliary engine 140.

160 Lithium-Ion Battery array is electrically connected to at least one generator [not shown] operated by power take-off 110 for maintaining battery array 160 in normal state of full electric charge. Battery array 160 is also electrically connected to auxiliary electric generator 130 so that battery array 160 may also be electrically charged by electric generator 130; Battery array 160 is also electrically connected to screw type compressor 120 so that compressor 120 may be powered by battery array 160 for short durations.

162 DC to AC converter.

164 Conventional 12 Volt batteries, which may be lead acid of gel.

170 Compressed air line conducting regulated compressed air from regulator 180 to rotary pneumatic motor 10.

180 Compressed air regulator for regulating pressure of compressed air produced by screw type compressor 120.

185 Dehumidifier for removing water and water vapor from compressed gas lines.

190 Compressed air gas lines to air regulator 180.

Figure 2:
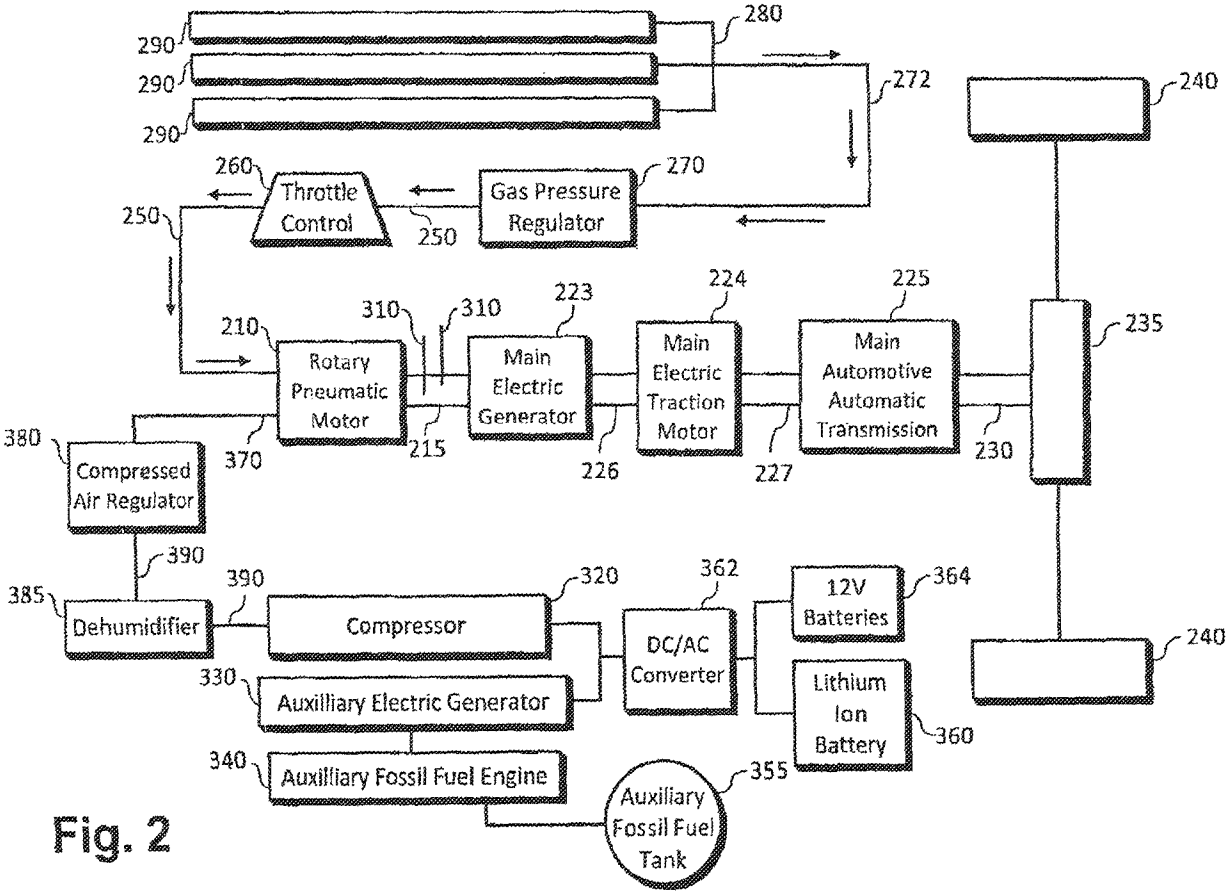
FIG. 2 shows a schematic view of the arrangement of Embodiment Number 2 of the present invention as adapted for a conventional automobile. This will be recognizable as either an electric automobile or a hybrid automobile and will also be recognized as the arrangement commonly seen in diesel-electric railroad locomotives, here with the conventional diesel engine replaced by the novel rotary pneumatic motor of the present invention.

For FIG. 2, Embodiment Number 2

210 Rotary Pneumatic Motor

215 Main Rotating power (torque) delivery shaft

223 Main electric generator

224 Main Electric traction motor

225 Main automotive automatic transmission

226 Electrical connection between main generator 223 and main electric motor 224 Electrical motor

227 Secondary Rotating power (torque) delivery shaft between main electric motor 224 and automotive automatic transmission 225.

230 Conventional Automotive shaft transmitting power from automatic transmission to gearbox

235 Conventional Automotive gearbox

240 Conventional Automotive traction wheels

250 Low-pressure (pressure regulated) compressed gas feed line input to Rotary Pneumatic Motor 210.

260 User throttle control for user control of gas pressure fed to rotary pneumatic motor 210.

270 Gas pressure regulator for regulating high-pressure compressed gas and furnishing it downline to rotary pneumatic motor 210 as regulated low-pressure compressed gas.

272 Feed line for conducting High pressure compressed gas from manifold 280 to pressure regulator 270.

280 Manifold for conducting high-pressured compressed gas from storage tanks 290 into high-pressure gas feed line 272.

290 Replaceable Refillable Storage Tanks for High Pressure Compressed Gas

310 Conventional Automotive power take-offs for such conventional applications as operating auxiliary generator or alternator, operating pumps for power steering and power braking, air conditioning compressors, and the like.

320 Electrically powered screw-type compressor produces compressed air to be fed via compressed air line 390 to compressed air regulator 380 and into feed line 370 for delivery of compressed air to rotary pneumatic motor 210 when compressed gas in tanks 390 has been depleted.

330 Auxiliary electric generator connected by electrical connection 150 to both screw type compressor 120 and to Lithium-ion battery array 160 for feeding electrical power to both 120 and 160 respectively or alternately for feeding electrical power to them one-at-a-time.

340 Auxiliary fossil fuel engine is connected to auxiliary electrical generator 330 for generating electrical power on demand to be fed to either or both screw type compressor 320 and/or Lithium-Ion battery array 360.

350 Electrical interconnection among screw type compressor 320, electric generator 330 and Lithium-ion battery array 360.

355 Auxiliary fossil fuel tank serves auxiliary engine 340.

360 Lithium-Ion Battery array is electrically connected to at least one generator [not shown] operated by power take-off 310 for maintaining battery array 360 in normal state of full electric charge. Battery array 360 is also electrically connected to auxiliary electric generator 330 so that battery array 360 may also be electrically charged by electric generator 330; Battery array 360 is also electrically connected to screw type compressor 320 so that compressor 320 may be powered by battery array 360 for short durations.

362 DC to AC converter.

364 Conventional 12 Volt batteries, which may be lead acid of gel.

370 Compressed air line conducting regulated compressed air from regulator 380 to rotary pneumatic motor 210.

380 Compressed air regulator for regulating pressure of compressed air produced by screw type compressor 320.

385 Dehumidifier for removing water and water vapor from compressed gas lines.

390 Compressed air gas lines to air regulator 180.

Figure 3:
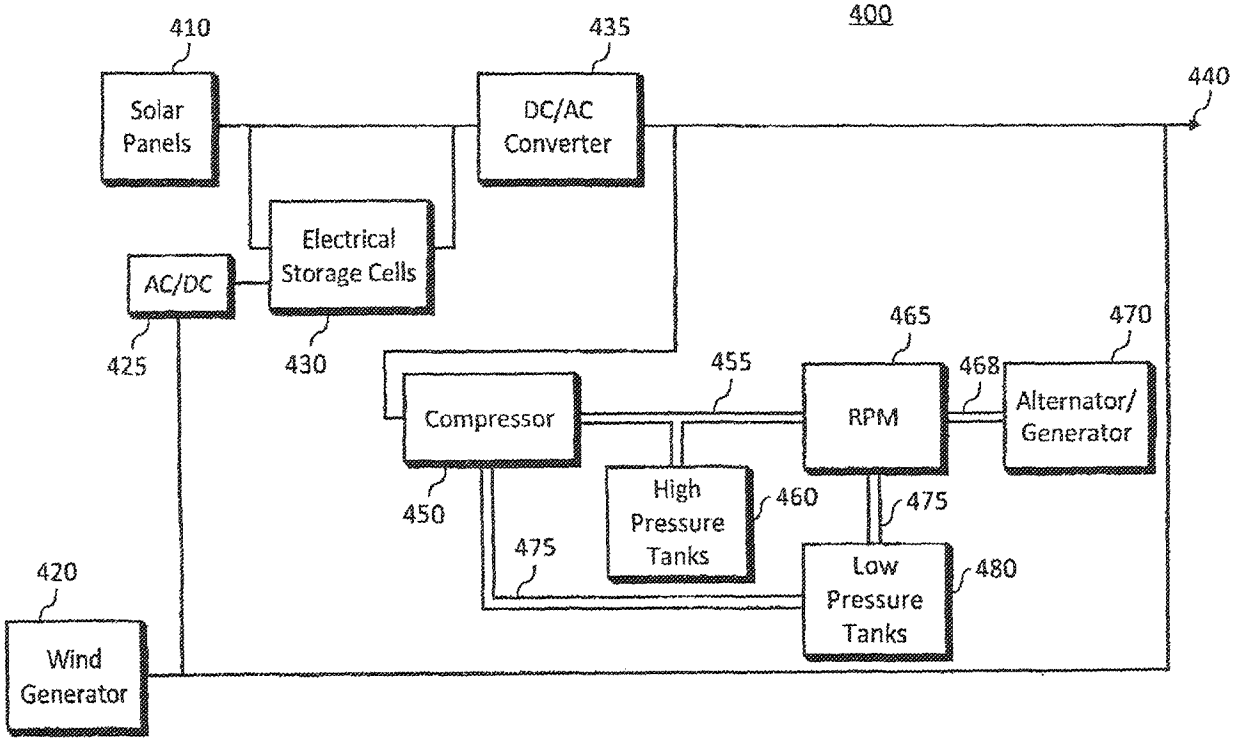
FIG. 3 is a system level schematic diagrammatic view of Embodiment Number 3 of the present invention adapted for use in an electrical power plant for turning solar and/or wind energy into electrical power.

For FIG. 3, Embodiment No. 3

400 Electrical Generating Plant

410 Solar Panels

420 Wind Generator

435 AC/DC converter

430 Electrical Storage Cells

435 DC/AC converter

Output port

450 compressor

455 high pressure conduit

455 high pressure tanks

465 RPM

470 Alternator/Generator

475 low pressure conduit

480 low pressure tanks

DETAILED DESCRIPTION OF THE INVENTION

In keeping with the objects of the invention, the present invention provides a novel mechanical power source by combining a rotary pneumatic motor with all manner of until-now fossil-fueled non-aviation mechanical power applications. While the arrangement of the present invention is known for driving power tools, the present invention's novel combination has not been applied to larger and heavier applications such as transportation, primary industrial scale electricity generation and smaller scale structural power applications such as residential, commercial, industrial and governmental heating, ventilation and air conditioning, as well as scatter-site small-to-medium scale electrical power generation for use on-site for such conventional uses as domestic or commercial electricity, space heating, cooking, and so forth.

Further novel in the present invention is the use of tanks of compressed gas, preferably nitrogen, not in liquid form, which is dry, as a primary source of motive power, and alternative source for generating AC in an industrial solar-driven or wind-driven electrical power plant. Air tools are known to use compressed air from a tank, but the tank is not a high-pressure primary source of power for the tools. The compressed air supply for air tools typically requires periodically replenishing expended tank air pressure with an electrically-driven compressor.

Instead, the present invention uses high-pressure refillable, replaceable tanks with gas pressure regulators to supply the rotary pneumatic motor with nitrogen gas, where possible, unlike the arrangement commonly seen with air-powered tools.

It is anticipated that compressed nitrogen gas not in liquid form as a power source will become more available as demand for it blossoms. Anticipated are convenient methods of delivering and transporting high-pressure compressed nitrogen, such as distributed automotive recharge stations in the same manner fossil-fuel automotive filling stations have widespread distribution. Compressed nitrogen could be transported long distances by pipeline and could be piped into structural locations such as residences, commercial locations, governmental and industrial facilities in the same manner natural gas is now supplied to many such locations.

Among the important advantages of using compressed nitrogen to drive rotary pneumatic motors is that the energy of compression of the gas itself is the energy source, unlike wherein the energy source of natural gas is not in its pressure, but rather in the chemical energy of its molecules to be released when it is burned.

Unlike the combustion of fossil fuels (of which natural gas is an important example) the use of pressurized nitrogen as a mechanical energy source involves no generation of heat of combustion whatsoever. By that very fact, use of compressed nitrogen trumps the best energy efficiency of fossil-fuel power applications because no matter whether the fossil fuel combustion occurs in an internal combustion engine such as a gasoline engine or diesel engine, or in external combustion situation such as in a furnace for space heating, there is a required massive waste of energy in the form of heat released to the atmosphere.

Using compressed gas, such as nitrogen, not in liquid form, requires no such wasting of energy. Rather, the energy stored in the nitrogen by virtue of its compression is turned directly (without a heat step) into mechanical energy in the torque feed from the drive shaft of the rotary pneumatic motor.

The rotary pneumatic motor, in turn, can easily power an electric generator of scalable size for doing almost any job electrically. Individual residential space can thus be heated electrically without the need for combustion. Large ocean-going vessels can be powered by electric motors driven by large quantities of electric power resulting from rotary pneumatic motors (driving large ships with electrically-driven propellers is already known, except that, unlike the present invention, the marine electricity is derived from diesel generators).

The nitrogen gas of the proposed invention is safe for environmental use because nitrogen comprises 78% of the earth's atmosphere. Producing nitrogen gas, not in liquid form, from atmospheric air or other sources, compressing it and releasing it according to the present invention would put nothing into the atmosphere that is not already there. The present invention thus eliminates fossil-fuel emissions of green house gasses from a wide variety of power applications, thus rapidly and dramatically addressing the issue of global warming.

Advantageous economic feasibility of the present invention will result from the fact that it will quickly reduce a user's dependence on increasingly scarce fossil fuels and achieve a large energy efficiency improvement over fossil fuels by eliminating the need for a heat-step in transforming energy into a kinetic form. Increases in efficiency translate into cost reductions. Cost reductions translate into economic benefits.

Of course, an important use for the present invention will be in transportation. Elimination of fossil-fuel burning heat engines from cars, trucks, buses, heavy equipment and railroad locomotives will immediately reduce the cost of transportation fuel, and thus the cost of transportation itself. Elimination of fossil fuels as in the present invention translates into replacing non-renewable energy sources with a clean endlessly renewable non-nuclear one.

Another important application of the present invention will be in industrial-scale power-plant electrical generation, where coal, oil or natural gas-fired steam-turbine plants may be replaced by industrial-scale rotary pneumatic motors to do the job of spinning the conventional electrical generators. Aside from the energy-efficiency improvement advantage and the reduction in the cost of electricity, a collateral but important advantage is that fossil-fuel smokestacks (especially Coal-fired) and their accompanying atmospheric emissions can be quickly replaced.

As described above with the description of embodiment Number 3, the nitrogen gas not in liquid form may be maintained in a closed loop system where the space is available for tanks capable of holding the large volume of nitrogen gas in it decompressed state.

The electrical generating power plant includes an array of solar panels for generating direct current (DC) and a DC/AC converter for converting the DC to alternating current (AC) and outputting a portion of the AC via a power plant output port to supply an AC load. An array of electrical storage cells electrically connected to the solar panels are controlled to receive and store DC power, and are controlled to output stored DC power for conversion and output by the DC/AC converter under certain conditions. A screw-type gas compressor connected to and powered by the DC/AC converter compresses nitrogen gas to a high pressure state to form a store of the high pressure nitrogen gas. A rotary pneumatic motor (RPM) connected to the compressor and high pressure gas drives and alternator/generator with the high pressure nitrogen to generate AC. The RPM outputs low pressure nitrogen which is looped back to the screw type compressor.

DETAILED DESCRIPTION OF THE DRAWINGS

FIG. 1 shows a schematic view of the arrangement of Embodiment Number 1 of the present invention as adapted for a conventional automobile. Only the rotary pneumatic motor and the power train are shown for storing energy in the form of compressed gas and controllably releasing it to the rotary pneumatic motor to produce torque to be supplied to a conventional automatic transmission.

Rotary Pneumatic Motor 10 is driven by regulated-pressure compressed nitrogen gas, not in liquid form, fed to it via feed line 50 or alternately by regulated-pressure compressed air fed to it via feed line 170. Motor 10 is connected by torque shaft 15 to automotive automatic transmission 25 while power take offs 110 from shaft 15 provide auxiliary power for power steering pumps, auxiliary electric alternators, air conditioning compressors, and all other conventional auxiliary automotive mechanical power requirements.

Automatic transmission 25 is conventionally connected by shaft 30 to conventional gearbox 35 for translating torque to conventional vehicle traction wheels 40. The primary source of drive energy for rotary pneumatic motor 10 is compressed gas, preferably nitrogen stored in high-pressure tanks 90 at about 4,000 PSI pressure and delivered via manifold 80, and high-pressure conduit 72 to regulator 70. In turn, regulator 70 reduces the gas pressure to from about 90 to about 150 PSI and feeds it to motor 10 via line 50. Tanks 90 are conveniently replaceable and conveniently refillable. In contrast to liquid nitrogen, which requires a vertical upward release of the liquid nitrogen from a tank, in the present invention, the gaseous nitrogen can be fed in any direction, up, down or sideways from tanks 90.

If primary pressure source from tanks 90 gets depleted before a recharge station is conveniently available, rotary pneumatic motor 10 can easily run on compressed air instead of compressed nitrogen. Thus, an alternate system of compressed air development is provided. Electrically-driven screw-type compressor 120 may furnish compressed air via line 190 to compressed air regulator 180. Interposed between compressor 120 and the air regulator 180 is a humidifier, or air drier 185. The humidifier or air drier 185 removes water vapor from the compressed air, the process causing any condensed water to evaporate and be withdrawn from the lines. The dry compressed air is for delivery via line 170 to the rotary pneumatic motor at pressures of from about 90 to about 150 PSI. Separate compressed gas feeds 50 and 170 may be combined into a single gas inlet via a manifold (not shown).

Screw-type compressor 120 will receive electrical energy from any of three sources: electrical generator 130 driven by auxiliary fossil fuel engine 140 and its accompanying fossil fuel tank 155, lithium-ion battery array 160, and 12 Volt battery, or set of 12 Volt batteries 164. Both the 12 volt battery 164 and the Li-ion battery 160 feed their DC current into a DC-AC converter, or inverter/charger 162 to drive the screw-type compressor 120.

Lithium-ion battery array 160 and the 12 Volt battery are readily kept electrically charged during normal primary-powered operation of rotary pneumatic motor 10 by means of a power take-off 110 driving an auxiliary electric generator (not shown). However, when primary nitrogen pressure has been depleted, screw-type compressor 120 may operate from electrical energy supplied by battery array 160 while battery array 160 is also receiving electrical charging from auxiliary generator 130. For that matter, the electrical generator may also be used to maintain the charge in the 12 Volt battery 164 where needed.

In this manner, the automotive application representing preferred Embodiment Number 1 of the present invention is shown having a fossil-fuel powered emergency source of compressed gas for continued operation of the rotary pneumatic motor.

FIG. 2 shows a schematic view of the arrangement of Embodiment Number 2 of the present invention also, as in FIG. 1, adapted for use as a conventional automobile. However, the arrangement of FIG. 2 will be recognizable as either an electric automobile or a hybrid automobile and will also be recognized as the arrangement commonly seen in diesel-electric railroad locomotives, here with the conventional diesel engine replaced by the novel rotary pneumatic motor of the present invention.

FIG. 2 is identical to FIG. 1 except for the interposition of an electric generator and an electric motor combination between the rotary pneumatic motor and the conventional automotive automatic transmission.

Rotary Pneumatic Motor 210 is driven by regulated-pressure compressed nitrogen gas not in liquid form fed to it via feed line 250 or alternately by regulated-pressure compressed air fed to it via feed line 370. Motor 210 is connected by torque shaft 215 to electrical generator 223, which is in turn electrically connected via electrical connection 226 to primary electric motor 224. Motor 224 is connected by conventional connection 227 to automotive automatic transmission 225 while power take offs 310 from shaft 215 provide auxiliary power for power steering pumps, auxiliary electric alternators, air conditioning compressors, and all other conventional auxiliary automotive mechanical power requirements.

Automatic transmission 225 is conventionally connected by shaft 230 to conventional gearbox 235 for translating torque to conventional vehicle traction wheels 240.

The primary source of drive energy for rotary pneumatic motor 210 is compressed gas, preferably nitrogen stored in high-pressure tanks 290 at about 4,000 PSI pressure and delivered via manifold 280, and high-pressure conduit 272 to regulator 270. In turn, regulator 270 reduces the gas pressure to from about 90 to about 150 PSI and feeds it to motor 210 via line 250. Tanks 290 are conveniently replaceable and conveniently refillable. In contrast to liquid nitrogen, which requires a vertical upward release of the liquid nitrogen from a tank, in the present invention, the gaseous nitrogen can be fed in any direction, up, down or sideways from tanks 290.

If primary pressure source from tanks 290 gets depleted before a recharge station is conveniently available, rotary pneumatic motor 210 can easily run on compressed air instead of compressed nitrogen. Thus, an alternate system of compressed air development is provided. Electrically-driven screw-type compressor 320 may furnish compressed air via line 390, through dehumidifier 385, to compressed air regulator 380 for delivery via line 370 to the rotary pneumatic motor 210 at pressures of from about 90 to about 150 PSI. Separate compressed gas feeds 250 and 370 may be combined into a single gas inlet via a manifold (not shown).

Screw-type compressor 320 will receive electrical energy from any of three sources: electrical generator 330 driven by auxiliary fossil fuel engine 340 and its accompanying fossil fuel tank 355, lithium-ion battery array 360 or 12 Volt battery, or battery array 364. Both the Li-ion battery 360 and 12 Volt battery 364 provides DC that is converted to AC in a DC/AC converter or inverter/charger 362.

Lithium-ion battery array 360 and conventional 12 volt battery 364 are kept electrically charged during normal primary-powered operation of rotary pneumatic motor 210 by means of a power take-off 310 driving an auxiliary electric generator (not shown). However, when primary nitrogen pressure has been depleted, screw-type compressor 320 may operate from electrical energy supplied by battery array 360 and 12 Volt battery 163, or auxiliary generator 330.

In this manner, the automotive application representing preferred Embodiment Number 2 of the present invention is shown having a fossil-fuel powered emergency source of compressed gas for continued operation of the rotary pneumatic motor.

FIG. 3 is a system level schematic diagrammatic view of Embodiment Number 3 of the present invention adapted for use in an electrical power plant 400. The power plant turns solar and/or wind energy into electrical power. The inventive non-heat engine in included to drive an electrical generator to generate electrical AC power to supplement or replace the electrical power generated by the solar panels and/or wind generator. During times when the solar panels generate an amount of electrical energy in excess of the plant's instant power needs, the excess electrical energy is used to drive a compressor to compress nitrogen gas, not in liquid form, and/or charge batteries. When the electrical output of the solar panels drops below the instant load need, the compressed gas is used to drive the RPM to generate AC to compensate, or to be used in place of AC generated by the solar panels.

Of course the AC generated by the RPM by the compressed gas can be supplemented by the DC stored in the batteries, after conversion to AC by an inverter/generator, or other efficient Dc to Ac converter. Because a physical plant may be presumed to have space for storing numerous tanks, as distinguished from the space available in a locomotive device, embodiment number 3 is a closed liquid nitrogen/gas system, where the low pressure nitrogen gas output from the RPM is stored at low pressure, in one or a number of tanks capable of handling the large volume of gas resulting from the down conversion of pressure.

In more detail, FIG. 3 depicts an exemplary power plant 400 that operates in accordance with the inventive principles. The power plant is shown to include both solar panels 410, and a wind generator or turbine 420 for generating electrical energy from the sun and wind respectively. The reader and the skilled artisan should note that the inventive electrical power plant is not limited to both solar panels and a wind turbine, but may include one or the other or both to meet the ready availability of sun and/or wind in a geographic location at which the power plant will be in operation.

The solar panels 410 are shown to feed their generated DC output to a DC/AC converter to a plant output 440. Part or all of the DC may be controlled to be directed to electrical storage cells or battery array 430. In time of need, the DC stored in the electrical storage cells 430 is controlled to be input to DC/AC converter 435 and output through port 440, or used to drive compressor 450. Wind generator 420 generates AC that is output directly from port 440, used to directly drive compressor 450, or stored for later use. When used for storage, the AC generated is converted to DC using an AC/DC converter 425, the DC output from which is provided to electrical storage cells 430.

Compressor 450 is driven by the AC provided by DC/AC converter 435 and/or the AC generated by wind generator 420. The compressor outs high pressure nitrogen gas, in the pressures described above. The high pressure nitrogen gas flows through high pressure conduit 455 to high pressure tanks 455 if it is to be stored, or to RPM 465 if it is to be used directly to generate AC by driving alternator generator 470. After expanding and delivering its potential energy stored in its high pressure state, the low pressure nitrogen gas exits the RPM via low pressure conduit 475, which connects the RPM to low pressure tanks 480. In contrast to liquid nitrogen, which requires a vertical upward release of the liquid nitrogen tank, in the present invention, the gaseous nitrogen can be fed in any direction, up, down or sideways from tanks 480.

The low pressure tanks are typically quite large, in order to maintain a volume of low pressure gas that can be at least one or of magnitude in volume larger that the high pressure tanks. The benefit is the ability to store the nitrogen to enable it the closed gas loop shown to include conduit 475 providing for controlled communication of the low pressure nitrogen with the compressor 450. That is, compressor 450 recompresses the nitrogen to the high pressure for storage or immediate reuse by the RPM.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further noted that the automotive embodiments shown in FIGS. 1 and 2, and the power plant embodiment of FIG. 3 are merely by way of example and not to be construed as limiting the scope of the present invention.

The present invention is a device and method for a pneumatic mechanical power source. The foregoing specification sets forth other applications that all share with the example of FIGS. 1, 2 and 3 the essential inventive step of the present invention, which is to eliminate the heat-step of the conventional methods of generating mechanical power by providing a rotary pneumatic motor driven by a supply of pressure-regulated compressed gas for light medium and heavy applications that have, heretofore, required a heat step in the production of mechanical kinetic energy.

It is further known that other modifications may be made to the present invention, without departing the scope of the invention, as noted in the appended Claims.

I claim:

1. A pneumatic-powered locomoting transporter device comprising:

a housing;

at least one rotary pneumatic motor (RPM) for generating pneumatic power;

a storage tank assembly of one or more refillable or replaceable storage tanks each having a supply of compressed substantially pure high pressure gas, which is not in liquid form and is free of water vapor, and said storage tank assembly comprises one or more user-replaceable, or user re-fillable gas storage containers that are arranged within said housing, means for withdrawing said high pressure working fluid of said compressed gas from said storage tank assembly;

means for reducing the high pressure of said working fluid from said storage tank assembly to a lower operating pressure in the range of about 90 PSI to about 150 PSI without the application of heat to said supply of compressed substantially pure gas;

a separate throttle control for delivering under controlled conditions said working fluid at the lower operating pressure without the application of heat to a pneumatic motor to produce a shaft torque output to operate a transmission propelling respective axle wheels on an axle, to move said pneumatic powered locomoting transporter device;

wherein said pneumatic motor is connected to said compressed gas storage containers by conduits having at least one gas pressure regulator in gaseous flow connection between said containers and said pneumatic motor;

at least one auxiliary power source for energizing an auxiliary engine;

at least one electric generating device for generating electric current; and at least one electrically powered screw-type compressor for compressing gas, the compressor electrically connected with said at least one electric generating device [and—in] *and in* fluid communication with said gas storage containers;

wherein said at least one rotary pneumatic motor (RPM) feeds said generated pneumatic power to said locomoting transporter device.

2. The device of claim 1 wherein said pneumatic-powered locomoting transporter comprises a user-operable motor vehicle drivable on public highways and comprising all customary conventional automotive components and dimensions required for fitness to operate upon public highways.

3. The device of claim 2 wherein said motor vehicle comprises a member of the group comprising automobiles, trucks, buses, construction equipment, heavy vehicular equipment and recreational vehicles.

4. The device of claim 2 wherein said pneumatic-powered locomoting transporter comprises any of the group consisting of: a floating marine vehicle and a railroad locomotive.

5. The device of claim 1, wherein interposed between said compressor and said gas pressure regulator comprises a [humidifier] *dehumidifier* air drier capable of removing water vapor from the supply of said compressed gas.

6. The pneumatic powered locomoting transporter device as in claim 1 wherein said auxiliary engine is a fossil fuel powered engine.

7. The device of claim 6, wherein said pneumatic motor delivers power to a vehicular drive train.

8. The device of claim 1 in which said auxiliary power source is a rechargeable battery array.

9. The device of claim 1, in which said auxiliary power source is an internal combustion engine.

10. The device of claim 1, in which said auxiliary power source includes means for switching between an internal combustion engine and a battery array.

11. The device of claim 10 wherein said separate source of electricity is a rechargeable battery pack.

12. The device of claim 1, further comprising a power takeoff mechanically coupled to said shaft torque output for driving an auxiliary electric generator.

13. The device of claim 1, wherein said compressor is a rotary screw type compressor.

14. The device of claim 1, wherein said pneumatic motor drives a main electric generator for producing electric power for auxiliary accessories.

15. The device of claim 14 wherein said at least one rotary pneumatic engine and automotive transmission are crankshaft-connected to said electrical traction motor, which said electrical traction motor is connected to said electrical generator powering the auxiliary accessories.

16. The device of claim 15, wherein said electric motor comprises a braking motor-generator for dynamic braking capture of vehicular kinetic energy as electrical energy and wherein said locomoting transporter comprises at least one array of lithium-ion batteries connected to said motor generator for capturing electrical energy resulting from said dynamic braking of said locomoting transporter to supplement said electrical generator.

[17. The device of claim 16, wherein said locomoting transporter device further comprises a stationary electric traction motor engine optionally powering said transmission wherein the power of said stationary engine is consumed in a stationary application.]

18. The pneumatic-powered locomoting transporter device as in claim 1 wherein said compressed gas is nitrogen.

19. The pneumatic powered locomoting transporter device as in claim 18 wherein said auxiliary engine is a an auxiliary compressor for delivering compressed air as a supplementary source of pressurized to supplement said pressurized gaseous nitrogen to said pneumatic motor when said pressurized gaseous nitrogen is not available from said storage tank assembly; and an auxiliary power source for driving said auxiliary compressor.

20. The device of claim 18, in which said pressurized gaseous nitrogen is reduced in pressure to a range from about 150 PSI to about 90 PSI working pressure.

21. The pneumatic-powered locomoting transporter as in claim 1 wherein said compressed gas is air, said pneumatic-powered locomoting transporter further comprises a dehumidifier for removing water and water vapor from said compressed air before said compressed air powers said rotary pneumatic motor.

*22. A pneumatic-powered locomoting transporter device comprising:*

*a housing;*

*a rotary pneumatic motor (RPM) for generating pneumatic power;*

*a storage tank assembly of one or more refillable or replaceable storage tanks each having a supply of compressed substantially pure high-pressure gas, which is not in liquid form and is free of water vapor, and arranged within said housing;*

*means for withdrawing said high pressure working fluid of said compressed gas from said storage tank assembly;*

*means for reducing the high pressure of said working fluid of said compressed gas from said storage tank assembly to a lower operating pressure in the range of about 90 PSI to about 150 PSI without the application of heat;*

*a throttle control, for delivering under controlled conditions, said working fluid of said compressed gas at the lower operating pressure to the rotary pneumatic motor (RPM) to produce a shaft torque output to operate a transmission propelling respective axle wheels on an axle, to move said pneumatic powered locomoting transporter device;*

*wherein said rotary pneumatic motor (RPM) is connected to said refillable or replaceable storage tanks by conduits that have at least one gas pressure regulator in gaseous flow connection between said containers and said rotary pneumatic motor (RPM) and wherein said rotary pneumatic motor (RPM) feeds said generated pneumatic power to said locomoting transporter device;*

*an auxiliary fossil fuel for energizing an auxiliary fossil fuel engine;*

*an auxiliary electric generating device for generating electric current; and*

*an electrically powered screw-type compressor for compressing gas, the compressor electrically connected*

*with said auxiliary electric generating device and in fluid communication with said gas storage tanks;*

*a main electric generator driven by said rotary pneumatic motor ('RPM) for generating electric power;*

*an electric traction motor using said electric power to produce motive power for a vehicle; and*

*a dynamic regenerative braking system which when applied causes said electric traction motor to operate as a generator feeding current back to an on-board lithium ion battery array for powering accessories.*

*23. The transporter device of claim 22 in which said electric traction motor provides traction for wheels of said vehicle.*

*24. A vehicle comprising:*

*a single prime mover comprising a main electric traction motor for providing an uninterrupted source of motive power during operation of the vehicle and a non-fossil fuel source for providing electric power for said main electric traction motor:*

*an electric battery array connected to and providing electric power to said prime mover;*

*an auxiliary electrical generator;*

*an auxiliary fossil fuel engine connected to and driving the auxiliary electrical generator: an auxiliary fuel tank serving the auxiliary fossil fuel engine; and*

*a braking system which when applied causes said main electric traction motor to operate as a generator feeding current to said electric battery array, to charge said electric battery array.*

*25. The vehicle as in claim 24, wherein said main electric traction motor receiving electric power from said electric battery array for driving a power train of said vehicle.*

*26. The vehicle as in claim 24, wherein said auxiliary electrical generator operates with a DC/AC converter.*

*27. The vehicle as in claim 26, wherein said auxiliary electrical generator is an inverter/charger.*

*28. The vehicle as in claim 25, wherein said auxiliary electrical generator is connected to and charges the electric battery.*

*29. The vehicle as in claim 25, wherein said auxiliary electric generator is connected to and provides electric power to said prime mover.*

*30. The vehicle as in claim 24, wherein said electric battery array includes any of the group consisting of: at least one 12 volt battery; at least one lithium ion battery and a combination of at least one 12 volt battery and at least one lithium ion battery.*

*31. An automobile, comprising:*

*a single prime mover comprising a main electric traction motor providing an uninterrupted motive source of power during operation of said automobile, for generating a primary shaft power output;*

*a main electric generator driven by shaft power output provided by a non-fossil fuel source;*

*an electric battery array:*

*an auxiliary fossil fuel engine connected to an auxiliary electrical generator for generating electrical power on demand: an auxiliary fuel tank serving the auxiliary fossil fuel auxiliary engine;*

*a secondary shaft power output, arranged between the main electric traction motor and an automotive transmission:*

*wherein said electric battery array is electrically connected to an auxiliary electric generator operated by the secondary shaft power output, for maintaining said electric battery array in a normal state of full electric charge.*

*32. The automobile as in claim 31, further comprising a DC/AC converter.*

*33. The automobile in claim 31, wherein said DC/AC converter is an inverter/charger.*

*34. The automobile as in claim 31, wherein said prime mover is main electric traction motor and wherein auxiliary electrical generator is connected to and supplies electrical power to the prime mover.*

*35. The automobile as in claim 31, wherein said electric battery array may comprise any of the group consisting of: at least one 12 volt battery; at least one lithium ion battery and a combination of at least one 12 volt battery and at least one lithium ion battery.*

*36. The automobile as in claim 31, wherein said prime mover is a main electric traction motor receiving electric power from said electric battery array for driving a power train of said vehicle and for generating the primary shaft power output.*

*37. A vehicle comprising:*

*a prime mover comprising a rotary pneumatic motor for providing a source of motive power for the vehicle using a main electric generator for powering a main electric traction motor;*

*an electric battery array connected to and providing electric power to a compressor for supplying air to said pneumatic motor;*

*an auxiliary electrical generator:*

*an auxiliary fossil fuel engine connected to and driving the auxiliary electrical generator: an auxiliary fuel tank serving the auxiliary fossil fuel engine; and*

*a braking system which when applied causes said main electric traction motor to operate as a generator feeding current to said electric battery array, to charge said electric battery array.*

*38. An automobile, comprising:*

*a prime mover comprising a rotary pneumatic motor for providing a motive source of power, for generating a primary shaft power output;*

*a main electric generator driven by said shaft power output;*

*an electric battery array;*

*an auxiliary fossil fuel engine connected to an auxiliary electrical generator for generating electrical power on demand; an auxiliary fuel tank serving the auxiliary fossil fuel auxiliary engine;*

*a secondary shaft power output, arranged between the main electric traction motor and an automotive transmission;*

*wherein said electric battery array is electrically connected to said auxiliary electric generator operated by the secondary shaft power output, for maintaining said electric battery array in a normal state of full electric charge.*

*39. The vehicle as in claim 37, further comprising a screw-type compressor, wherein said auxiliary electrical generator generates and provides electrical power to the screw type compressor associated with said rotary pneumatic motor.*

* * * * *